United States Patent [19]
Bongers

[11] 3,964,851
[45] June 22, 1976

[54] APPARATUS FOR CURING ELONGATE WORKPIECES

[75] Inventor: Hendrikus-Johannes Bongers, Eindhoven, Netherlands

[73] Assignee: G. Siempelkamp & Co., Krefeld, Germany

[22] Filed: Aug. 27, 1975

[21] Appl. No.: 608,347

[30] Foreign Application Priority Data
Aug. 27, 1974 Germany............................ 2441081

[52] U.S. Cl............................ 425/324 R; 425/339; 425/383; 425/445; 100/195; 100/199
[51] Int. Cl.²..................... B29C 3/00; B29C 17/02
[58] Field of Search................. 425/445, 324 R, 338, 425/339, 383, 450 C, 406, 66; 100/93 P, 193, 195, 199

[56] References Cited
UNITED STATES PATENTS

| | | | |
|---|---|---|---|
| 2,602,188 | 7/1952 | Gorecki | 425/339 X |
| 2,867,845 | 1/1959 | Sauer | 425/339 X |
| 2,884,032 | 4/1959 | Thurnher | 100/199 X |
| 3,050,777 | 8/1962 | Siempelkamp | 100/195 X |
| 3,600,746 | 8/1971 | Kostur et al. | 425/383 X |
| 3,613,155 | 10/1971 | Bloxsom | 425/66 X |
| 3,868,204 | 2/1975 | Bongers | 425/338 |

*Primary Examiner*—Robert L. Spicer, Jr.
*Attorney, Agent, or Firm*—Karl F. Ross; Herbert Dubno

[57] ABSTRACT

A web of unvulcanized rubber or other curable material moves intermittently in generally horizontal passes through several superposed stages of a multiplaten press by way of a pair of stretching stations flanking the press, each stretching station including a clamp and, with three or more curing stages, at least one deflection roller for the web. Each clamp has at least two jaws which are closable around one or more web passes and, together with the associated deflection roller or rollers, initially hold these passes substantially on the level of the midplanes of the spaces between the open press platens. From this position the jaws and rollers are jointly displaceable in a vertical direction (e.g. downwardly), after a stretching of the web by an outward movement of the clamps and/or the rollers, into a position in which the several passes come to rest simultaneously on the heated platens between movable spacing strips. The platens thereupon successively close in the opposite vertical direction (e.g. upwardly) to start the curing process. During or immediately after the press closure the clamps and rollers are returned to their original elevation so that the passes of the web lie again about midway between the platens when the press is reopened.

10 Claims, 14 Drawing Figures

APPARATUS FOR CURING ELONGATE WORKPIECES

FIELD OF THE INVENTION

My present invention relates to an apparatus for curing elongate workpieces of polymeric material, such as conveyor belts, in a multiplaten press; the term "curing" includes vulcanization in the case of rubber and final polymerization in the case of synthetic resin.

BACKGROUND OF THE INVENTION

In my prior U.S. Pat. No. 3,868,204 I have disclosed an apparatus of this description wherein the web to be cured is led in several generally horizontal passes through a stack of heated press platens forming two or more curing stages between them, the press being flanked by a pair of clamps movably disposed at opposite sides of the stack. Each clamp has as many jaws as there are platens in the stack; the clamp jaws and the press platens are substantially aligned so as to bracket the several passes of the web which is guided around one or more stationary deflection rollers positioned beyond one or both clamps as seen from the press. A preferably hydraulic actuating mechanism first closes the jaws of the clamps on the interposed web passes, then moves the clamps apart to stretch these passes and finally closes the hot platens on the stretched web portions to cure them by the applied heat and pressure. Upon subsequent reopening of the clamps and the press, the web is advanced to position previously uncured web portions between the platens.

Since the closure of the clamp jaws necessarily precedes that of the press platens, at least one of the web portions to be cured must be either raised or lowered within the clearances present between the platens of the open press so as to approach or even come into contact with one of the confronting surfaces of the associated platen pair. This results in premature exposure of certain web portions to the press heat so that curing will not be uniform throughout the web.

In many instances the press platens are provided with lateral spacing strips which limit the approach of the platens toward one another upon closure and which may be adjustable to accommodate webs of the different widths. Such adjustment may be carried out automatically, immediately before the closure stroke, by letting the web come to rest on a surface (usually the lower one) of the associated platen pair carrying these spacers while the same are separated by a distance greater than the web width. The spacers are then moved toward each other until both are contacted by the web edges whereupon the press is closed. In such a system it is particularly desirable, for the sake of uniform curing, that the deposition of the web portions on the spacer-equipped platen surfaces and the subsequent adjustment of the spacers should take place simultaneously in all curing stages.

OBJECTS OF THE INVENTION

An object of my present invention, therefore, is to provide an improved actuating mechanism for a system of the type disclosed in my prior patent which minimizes or eliminates the differences in the relative positions between the press platens and the corresponding web portions during the stretching operation.

A more particular object is to provide means in such a system for facilitating simultaneous engagement of the several web portions by associated spacers just before the press-closing stroke.

SUMMARY OF THE INVENTION

The apparatus according to my present invention has the same basic structure as that of my prior patent U.S. Pat. No. 3,868,204, namely a multiplaten press flanked by a pair of stretching stations each provided with web-engaging means including a clamping section. Depending on the number of curing stages and therefore the number of passes, there is also provided a deflecting section at one or both stations forming part of the web-engaging means thereof. With only three platens and two curing stages, a single deflecting roller at one station suffices as has been shown in the above-identified prior patent. With an odd number of curing stages, the two stations will be essentially symmetrical with the same number of deflecting rollers on each side of the press.

In general, the stretching of the web before each curing operation can be carried out in one of two ways, i.e. with a simultaneous gripping of all web passes at both ends by the two clamping sections which are then driven apart, as described in the prior patent, or by the gripping of only one pass at each station (i.e. an incoming web portion at one station and an outgoing web portion at the other station) followed by a displacement of the deflecting rollers in opposite directions. In the latter instance only two jaws of each stretching station exert a clamping action while the remaining jaws, if any, serve only as guides which control the elevation of the respective web passes. Thus, the actuating mechanism correlating the stretching and curing operations may be designed to displace only one section of each web-engaging means in a horizontal direction, i.e. the clamping section in the first-mentioned case or the deflecting section in the last-mentioned one. Since, however, a horizontal displacement of the clamping sections without corresponding movement of the deflecting sections will cause the web to slacken between the clamps and the rollers, it will be preferable to move the rollers in unison with the clamps if the latter are horizontally reciprocable.

In accordance with an important feature of my present invention, the web-engaging means at each stretching station is vertically shiftable relatively to the press between a first and a second position, preferably together with a carriage supporting the clamping and deflecting sections. In the first position, assumed by the web-engaging means in the open state of the press during the advance of the web through the curing stages, the web passes are held by the clamp jaws and/or deflecting rollers at levels substantially midway between the confronting surfaces of an associated platen pair; in the second position, into which the clamping and deflecting sections are moved just prior to closure of the press, each pass is held by the web-engaging means at each stretching station onto a surface of the associated platen pair, advantageously the surface carrying the aforementioned spacers which can then be moved into contact with the web edges.

The closure of the press platens takes place in the opposite vertical direction, i.e. upwardly if the clamping and deflecting sections shift downwardly from their first to their second position. This closure is accompanied or followed by a return of the web-engaging means to the first position so that, upon the subsequent reopening of the press, the web passes are again substantially centered between the associated platen surfaces. Naturally, gravitational sagging of the web must be taken into account in establishing the relative positions of the platens and the rollers and jaws.

Finally, the horizontally displaceable clamping and/or deflecting sections are returned to their original positions prepatorily to a new stretching and curing cycle. This return motion may coincide with the operation of the feed mechanism which intermittently advances the web by $n$ times the effective length of the platens, $n$ being the number of curing stages.

BRIEF DESCRIPTION OF THE DRAWING

The above and other features of my invention will now be described in detail with reference to the accompanying drawing in which.

SPECIFIC DESCRIPTION

Figure 1:
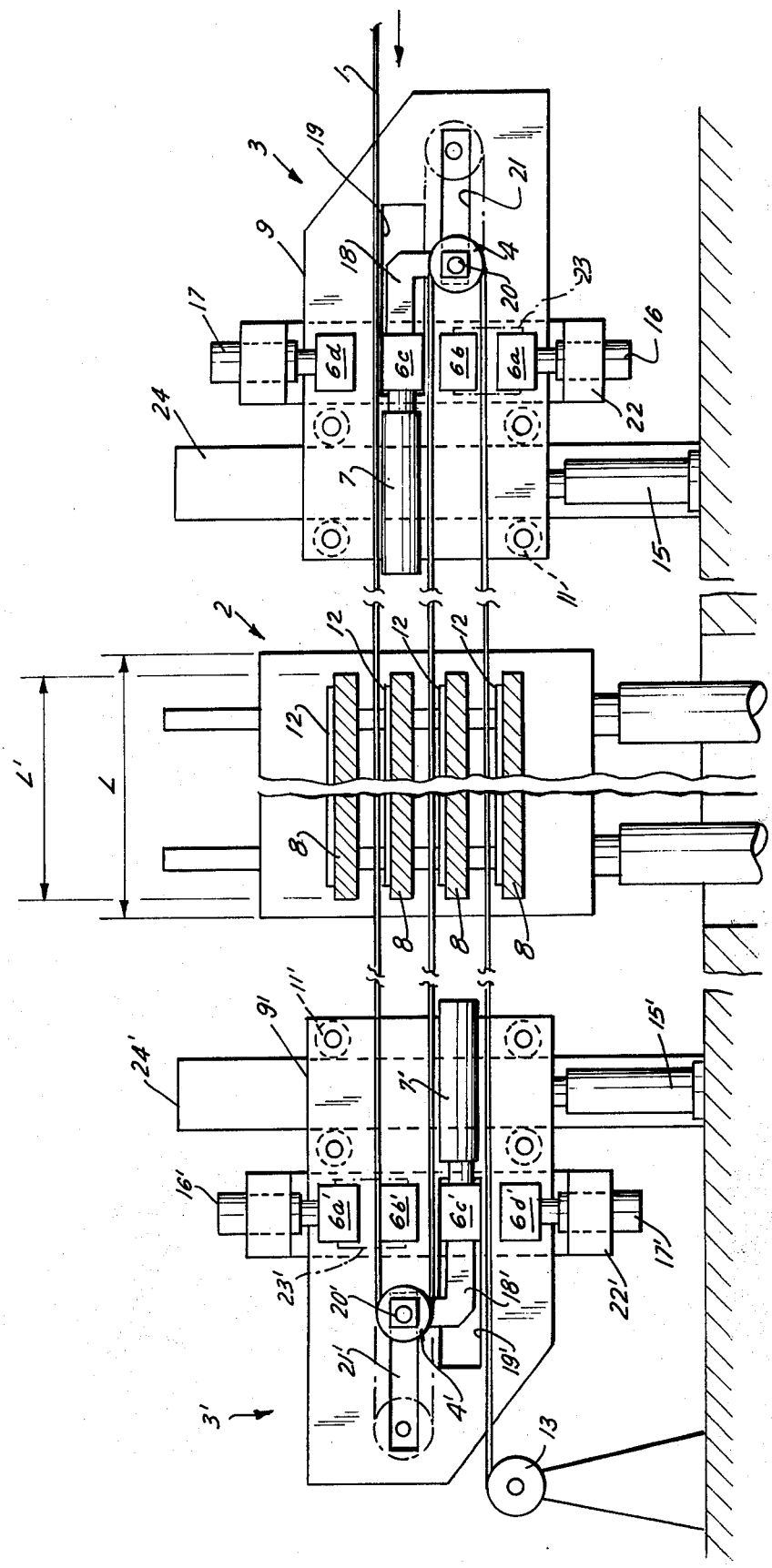
FIG. 1 is a somewhat schematic side-elevational view, partly in section, of an apparatus embodying my invention.
Figure 2:
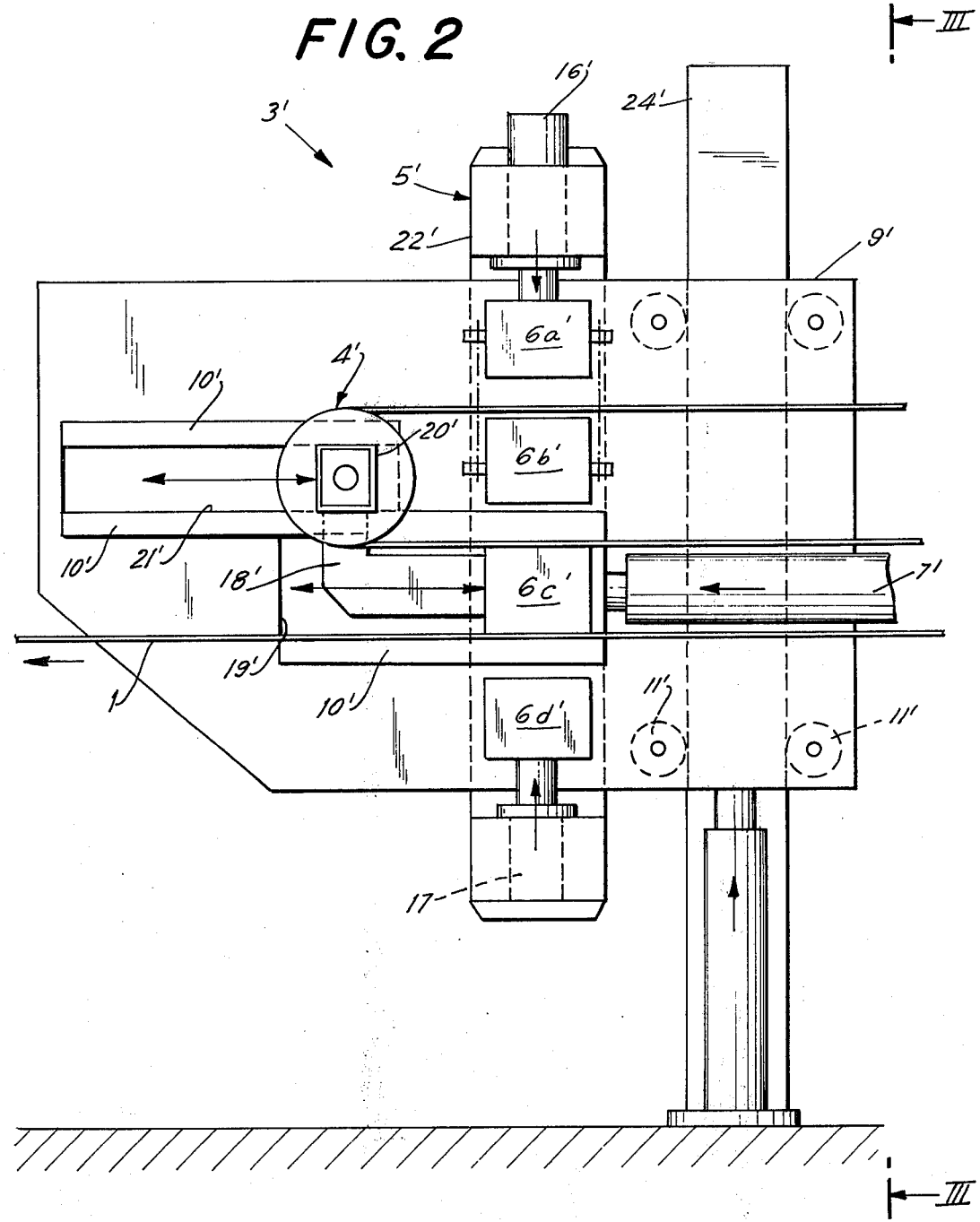
FIG. 2 is a side-elevational view of a stretching station forming part of the apparatus of FIG. 1, drawn to a larger scale.
Figure 3:
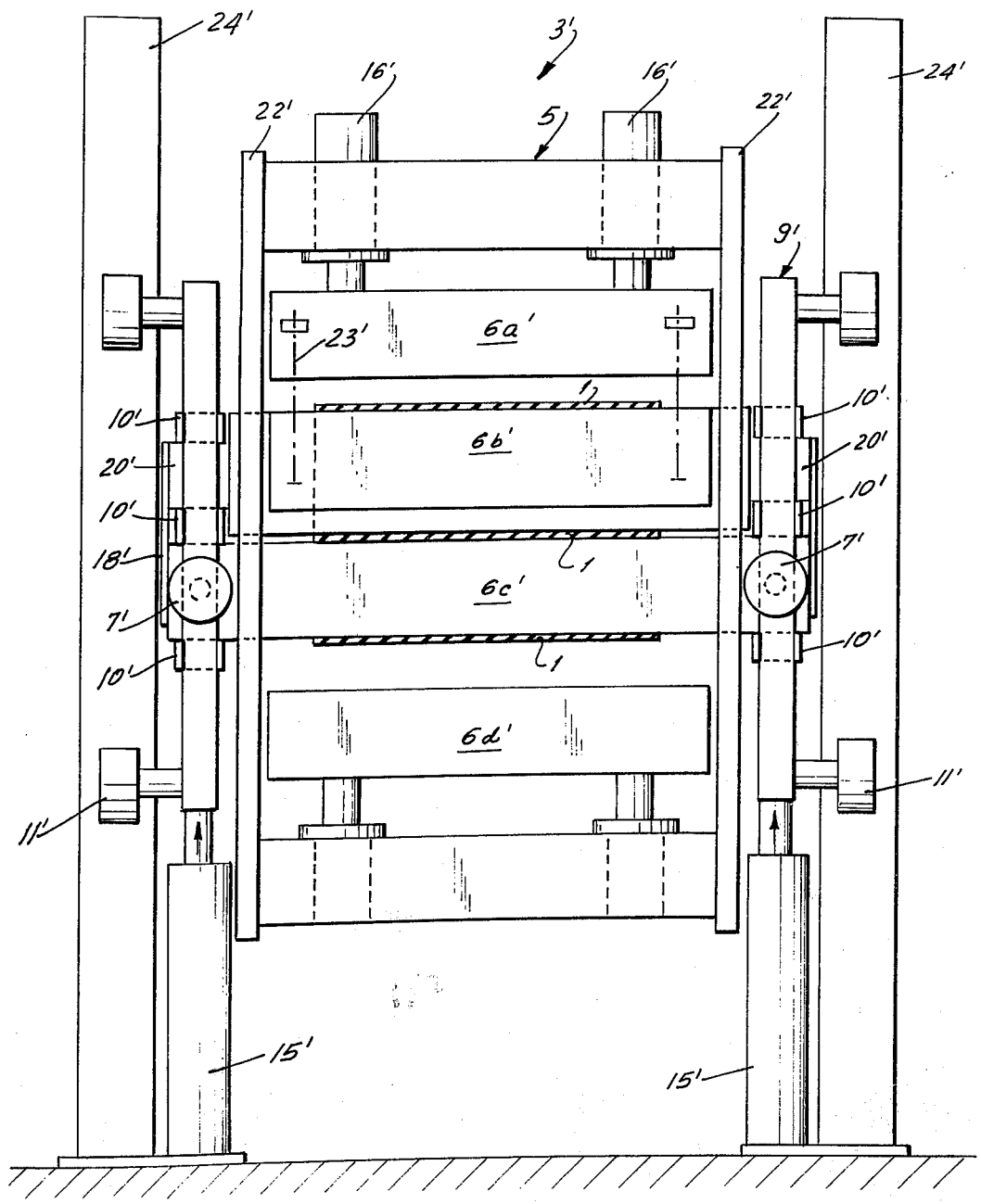
FIG. 3 is a cross-sectional view taken on the line III — III of FIG. 2.

In FIGS. 1–3 I have shown a multiplaten press 2 forming part of a web-curing apparatus of the general type disclosed in my prior patent U.S. Pat. No. 3,868,204, the apparatus further comprising a pair of stretching stations 3, 3' flanking the press. An elongate web 1 to be vulcanized or otherwise cured, e.g. for incorporation in a conveyor belt, is intermittently advanced through stations 3, 3' and press 2 by feed means diagrammatically represented by a driven take-off reel 13. The nonillustrated reel drive is synchronized with a hydraulic actuating mechanism for operating the press 2 and the stretching stations 3, 3', this mechanism including hydraulic jacks 14 for closing and opening the press as well as further jacks 7, 15, 16, 17 and 7', 15', 16' and 17' whose functions will be described below.

Press 2 is shown provided with a stack of four heated platens 8 defining three curing stages between them. These platens have an effective length L' in the direction of web motion, that length being slightly less than the overall extent L of the press in that direction in view of the provision of conventional cooling zones (not shown) at the entrance and exit ends of the press. Thus, distance L' equals the length of a web portion cured in one press stage during an operating cycle. Since there are three such curing stages, the web must be advanced between press closures by a length 3L'.

Each stretching station 3, 3' comprises a deflecting section 4, 4' in the form of a single roller and a clamping section 5, 5' with four jaws 6a - 6d and 6a' - 6d' positioned substantially at the levels of the several platens 8. The rollers 4, 4' and clamps 5, 5' are supported on respective carriages 9, 9' which are vertically reciprocable by the jacks 15 and 15'. Rollers 4 and 4' are journaled on elbows 18, 18' which are rigid with jaws 6c and 6c', respectively, these jaws in turn being horizontally guided in slots 19, 19' of carriages 9 and 9'.

Elbows 18 and 18' terminate in bearing blocks 20 and 20' for the shafts of rollers 4 and 4', these bearing blocks being guided in respective slots 21 and 21' of carriages 9 and 9'. Each clamp 5 and 5' further comprises an upright frame 22, 22' bracketing the jaws 6a - 6d and 6a' - 6d' thereof. Jaw 6a, at the bottom of frame 22, and jaw 6a', at the top of frame 22', are engaged by the pistons of jacks 16 and 16', respectively. The oppositely positioned jaws 6d (at the top of frame 22) and 6d' (at the bottom of frame 22') are similarly engaged by the pistons of jacks 17 and 17', respectively. Jaws 6b and 6b' are linked with the adjoining jaws 6a and 6a' via spring-loaded jacks of the type described in my prior patent, these latter jacks being diagrammatically illustrated at 23, 23' and enabling a gripping of the web 1 by closure of the jaw pairs 6a, 6b and 6a', 6b' as well as a joint thrusting of each of these jaw pairs by jack 16 or 16' toward the jaw 6c or 6c' whose vertical position relative to the carriage 9 or 9' is fixed by the slot 19 or 19'. The entire frame 22 or 22' is horizontally reciprocable, along with deflecting roller 4 or 4', under the control of jack 7 or 7'.

Figure 6:
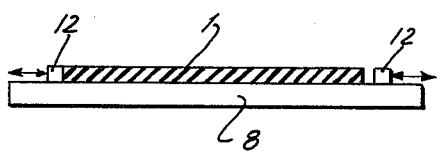
FIG. 6 is a cross-sectional detail view.

The upper surface of each of the three lower platens 8 carries a pair of spacing strips 12 which, as best seen in FIG. 6, lie alongside the edges of web 1 and are transversely shiftable to accommodate different web widths and to define the proper position for the web portion to be cured. The height of strips 12 is somewhat less than the original web thickness which is thus reduced to that height when the press is closed. The strips 12 also prevent an undesirable enlargement of the web width under the pressure of the platens.

FIGS. 2 and 3 show further details of stretching station 3' which of course is also representative of station 3. Rails 10' extend along the upper and lower edges of slots 19' and 21' to guide the bearing blocks 20' and the jaws 6c'. Rollers 11' ride along uprights 24' to stabilize the carriage 9' for vertical reciprocation under the control of jacks 15'. Rollers 11 and uprights 24 of station 3 have been indicated in FIG. 1.

As explained in my prior patent, the length of the web section looped around each deflecting roller 4, 4' should equal the length L' of a cured web portion in order that these portions follow one another in a continuous sequence and no part of the web is compressed more than once. The same result can also be achieved if the length of each loop is increased by 2L', i.e. if the spacing of each roller from the press (with allowance for the aforementioned cooling zones) is 3L'/2 instead of L'/2. For a press with only two curing stages and a single deflecting roller, the distance of that roller from the press should be equal to or a multiple of L'. Naturally, these dimensions apply to the stretched state of the web, i.e. with the rollers in their off-normal positions indicated in phantom lines in FIG. 1.

Reference will now be made to FIGS. 4A – 4G for a description of the sequence of operating steps in the simultaneous curing of three spaced-apart portions of web 1 in the press 2 by the apparatus shown in FIGS. 1–3. These Figures show only the right-hand stretching stage 3 of FIG. 1. Its left-hand counterpart 3' operates concurrently in the same manner, except that a downward movement of the uppermost jaw 6d in station 3 toward the vertically fixed jaw 6c is accompanied by an upward movement of the corresponding lowermost jaw 60' in station 3' toward the vertically fixed jaw 6c' thereof; analogously, upward movements of the lower jaws 6a and 6b in station 3 are accompanied by downward movement of the corresponding upper jaws 6a' and 6b' in station 3'.

Figure 4A:
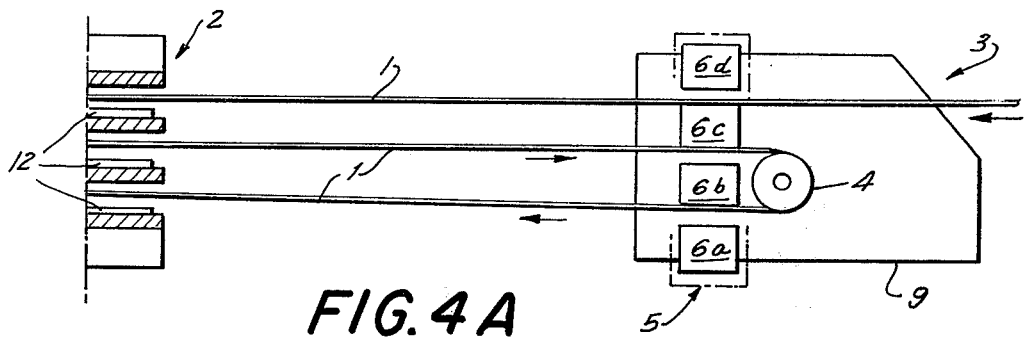
FIGS. 4A–4G are diagrammatic views of successive steps in the operation of a stretching station.

FIG. 4A represents the starting position with the press 2 in its open state, the web 1 having just been advanced by a length 3L' (as indicated by arrowheads) to position a previously uncured web portion in the clearance between each pair of heated platens 8. It will be noted that the height and position of the slot-guided jaw 6c is such that the two web passes resting against the upper and lower surfaces of this jaw are substantially centered between the confronting platen surfaces of their respective curing stages. These two passes form part of the loop embracing the roller 4' at stage 3', roller 4' being aligned with the jaw 6c and having a diameter equal to the height of that jaw. The lowermost pass is similarly centered by roller 4 (which also helps determine the elevation of the middle pass) and the undersurface of jaw 6b as well as that of jaw 6c' at the opposite end. The sag of the web between the two stations 3, 3' is taken into consideration by a lowering of the stack of platens 8 relative to the stretching stations, yet this has not been indicated in the drawing.

Figure 4B:
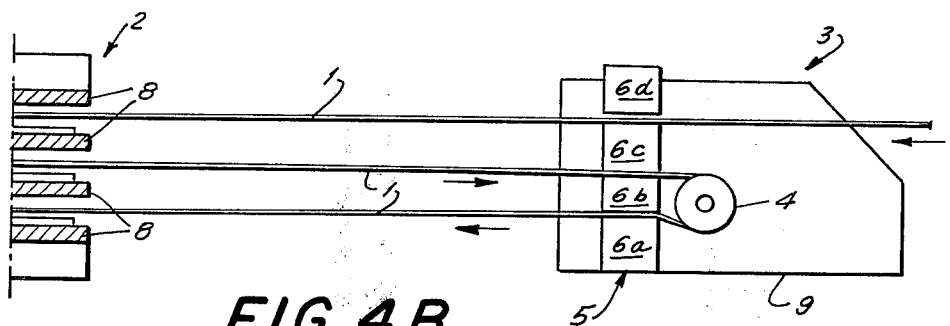

Next, as illustrated in FIG. 4B, jaws 6a and 6b are raised to clamp the two lower passes between jaws 6a – 6c. This operation does not change the position of the middle pass determined by the bottom face of jaw 6c and the top face of jaw 6c'. Since the closure stroke of the jaws is small compared to that of the press platens, the rise of jaw 6a has only a minor effect upon the centered position of the bottom pass which is further reduced by the fact that the opposite end of that pass does not move. The same consideration applies to the top pass whose right-hand end rests on the stationary jaw 6c while its left-hand end is slightly lowered by the descent of jaw 6a'. Placing the clamp jaws as close as possible to the deflecting rollers, and therefore at a minimum distance of approximately L'/A from the ends of the press, minimizes the resulting offset of the upper and lower web portions from the midplanes of their respective curing stages.

Figure 4C:
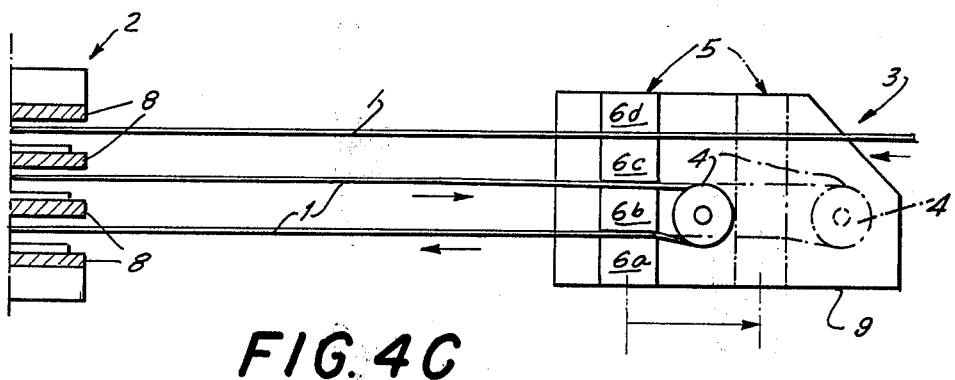

FIG. 4C illustrates the completion of the clamping operation by the closure of jaw 6d against jaw 6c. All three web passes are now securely gripped at both ends. It will be noted that the position of the top and bottom passes is not changed by the clamping step of FIG. 4C.

As indicated in phantom lines in FIG. 4C, roller 4 and clamp 5 are now displaced outwardly (i.e. to the right) with reference to carriage 9 by operation of the jack 7 shown in FIG. 1; the concurrent operation of jack 7' results in a symmetrical stretching of all three web passes.

Figure 4D:
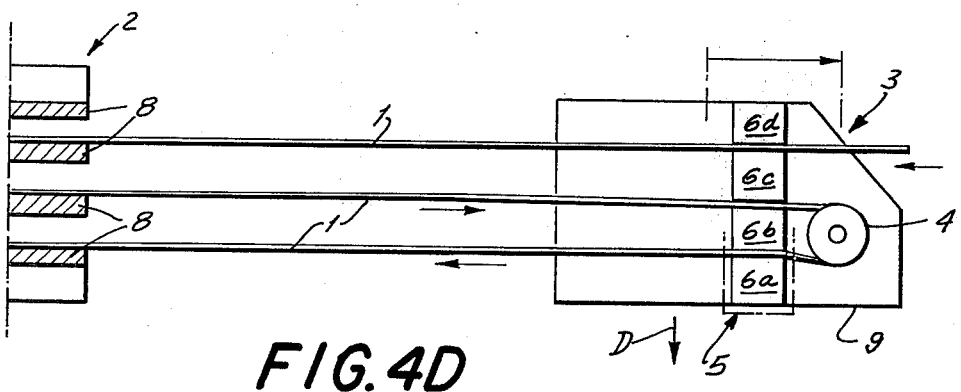

In FIG. 4D the carriage 9 of station 3 (as well as the carriage 9' of station 3') has been moved down, as indicated by an arrow D, into an alternate position in which all three passes of web 1 come to rest between the spacing strips 12 of their lower platen surfaces. These strips, previously held withdrawn, are then moved toward each other to center the web as illustrated in FIG. 6. These operations occur simultaneously in all three curing stations so that the three web portions are subjected to the same amount of preheating by their lower platens.

Figure 4E:
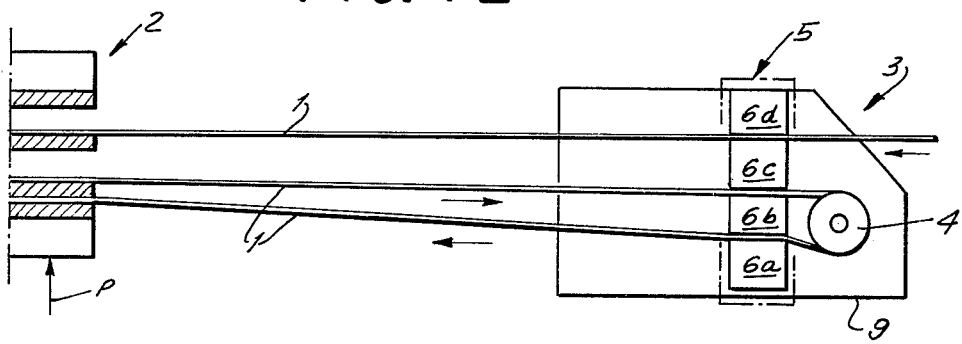
Figure 4F:
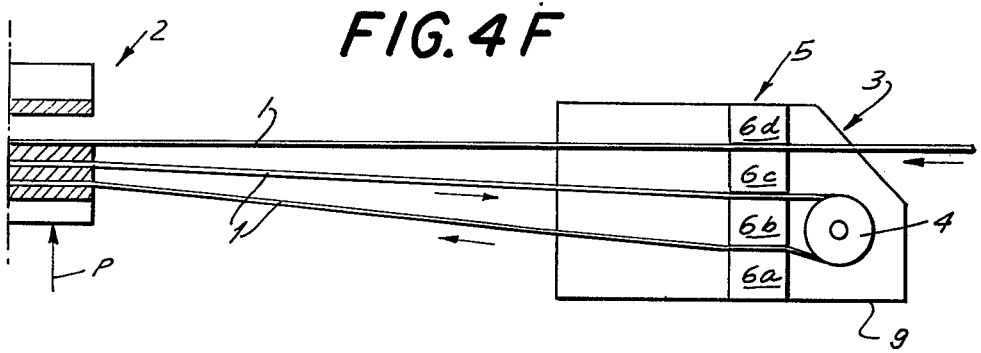
Figure 4G:
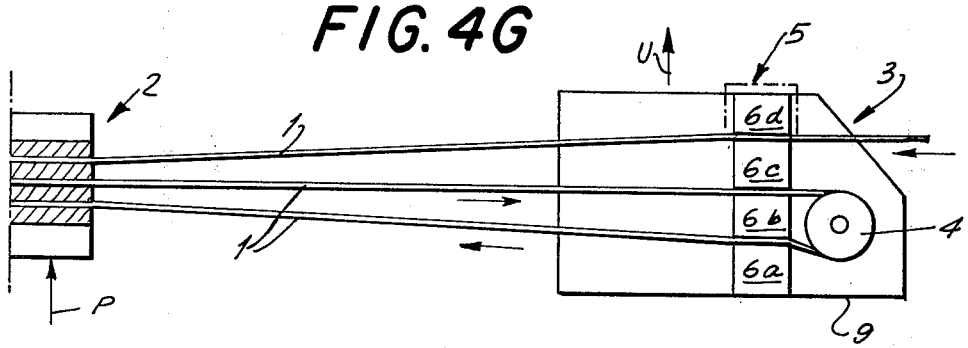

As indicated by an arrow P in FIGS. 4E–4G, the press now closes with an upward stroke around the lower pass (FIG. 4E), the middle pass (FIG. 4F) and the upper pass (FIG. 4G) in rapid succession. The staggering of the closure times amounts to only a negligible fraction of the curing period and could also be compensated by a subsequent reopening of the press in the same sequence. With the press completely closed, as shown in FIG. 4G, the carriage 9 is moved up (arrow U) into the position of FIGS. 4A–4C; this may be done at any time before the press reopens.

The final step, not separately illustrated, involves a return of the deflection rollers and clamps to their original positions closer to the press 2 as illustrated in FIGS. 4A–4C and in full lines in FIG. 1. This restoring motion may coincide with the next advance of the web 1 in the direction of the arrowheads. The cycle is then recommenced.

Figure 5A:
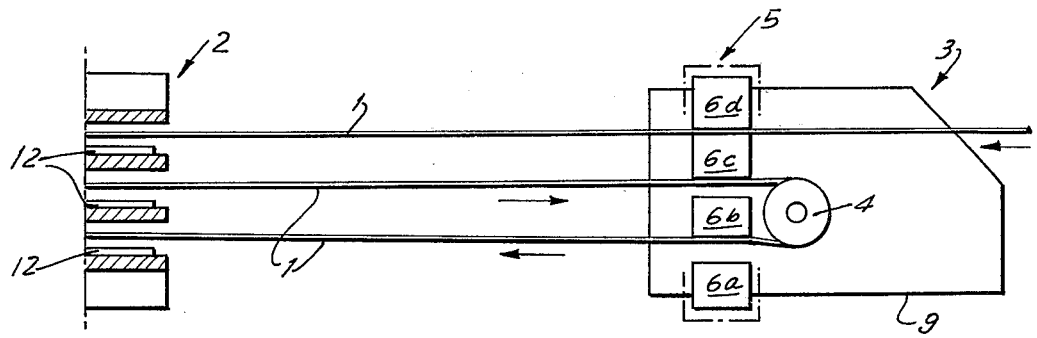
FIGS. 5A–5C are similar diagrammatic views relating to a modification.
Figure 5B:
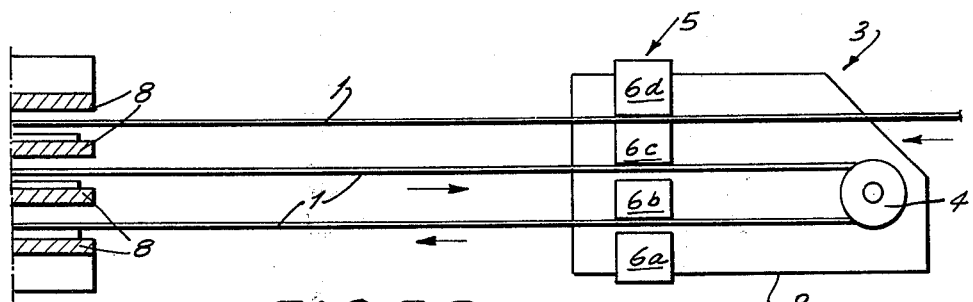
Figure 5C:
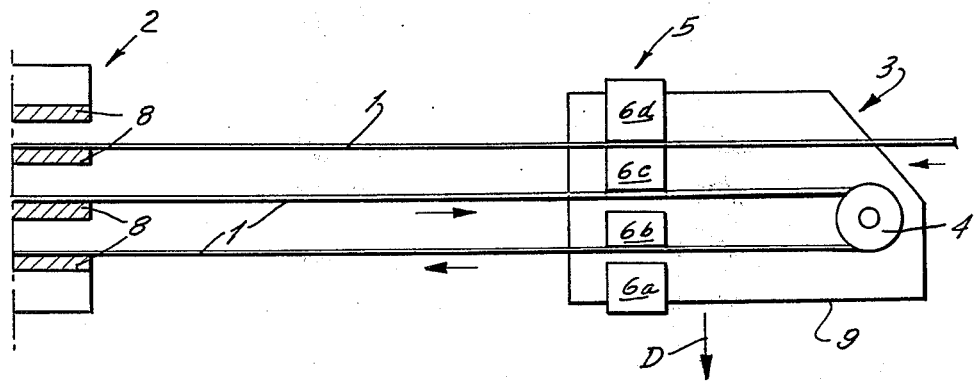

In FIGS. 5A–5C I have shown an alternate mode of operation which does not involve any horizontal displacement of clamps 5 and 5'; the initial position is that of FIG. 4A and is followed by a lowering of clamp jaw 6d, FIG. 5A, and a corresponding raising of clamp jaw 6d' to grip the incoming and outgoing sections of the web 1. Next, as shown in FIG. 5B, the roller 4 is moved outwardly on carriage 9 to stretch the lower and middle passes which extend with slight clearance between the open jaws 6a–6c; the concurrent movement of roller 4' similarly stretches the middle and upper passes. In this operation the rollers may undergo some compensatory rotation to equalize the stresses in the several passes. Thereafter, according to FIG. 5C, carriage 9 is lowered (arrow D) as in FIG. 4D. The subsequent steps are the same as those shown in FIGS. 4E – 4G. Jaws 6a and 6b (as well as their counterparts 6a' and 6b') have only a guiding function and can be omitted. Also, since this mode of operation does not entail even a minor vertical deflection of the web passes, the clamps 5 and 5' could safely be located at a closer distance from the press.

It will be understood that carriages 9 and 9' could be made both horizontally and vertically displaceable, with the rollers and clamps fixedly mounted thereon, to perform the aforedescribed shifting and stretching operations.

I claim:

1. An apparatus for curing a web of polymeric material, comprising:
    a press with a stack of heated platens, including a top platen, a bottom platen and at least one intermediate platen, forming a plurality of superposed curing stages between them;
    a pair of stretching stations flanking said press, each of said stations being provided with web-engaging means for leading a web in several passes through said stations and said stages, said web-engaging means including a clamping section in each of said stations and a deflecting section in at least one of said stations, said clamping section being provided with at least a top jaw and an intermediate jaw at one station and with at least an intermediate jaw and a bottom jaw at the other station substantially aligned with said platens for bracketing at least the outermost passes of said web entering and leaving said stages, at least one of said sections of said web-engaging means at each of said web-engaging means at each of said stations being horizontally movable relatively to said press for stretching said web upon a gripping of at least one pass thereof by said clamping section, said web-engaging means at each of said stations being vertically shiftable relatively to said press between a first and a second position, said web-engaging means in said first position holding said passes at levels substantially midway between confronting surfaces of an associated platen pair in an open state of the press, said web-engaging means in said second position holding each of said passes onto a surface of the associated platen pair in said open state of the press;

intermittently operable actuating means for operating said clamping section at each of said stations to grip said web in said first position with the press in its open state, displacing said horizontally movable sections at said stations away from each other to stretch the passes of said web spacedly extending between said platens, vertically shifting said web-engaging means at each of said stations from said first position to said second position, thereupon closing said platens on the passes of said web with a vertical motion opposite that of the shifting of said web-engaging means into said second position, vertically shifting said web-engaging means in said opposite direction into said first position at each of said stations, reopening the press after the curing of web portions subjected to heat and pressure between said platens, releasing said web from said clamping at each of said stations, and returning said horizontally movable sections to their original positions; and feed means operative upon a reopening of said platens and the release of said web from said clamping sections for positioning previously uncured web portions between said platens.

2. An apparatus as defined in claim 1 wherein each platen pair is provided on one of said confronting surfaces with two lateral spacers accommodating said web between them during the curing process, said web-engaging means in said second position holding said passes onto the surfaces carrying said spacers.

3. An apparatus as defined in claim 1 wherein each of said stations comprises a vertically shiftable carriage supporting said web-engaging means thereof.

4. An apparatus as defined in claim 3 wherein said intermediate jaw is vertically fixed with reference to said carriage.

5. An apparatus as defined in claim 4 wherein the number of said platens is greater than three, said web-engaging means including a deflecting section at each of said stations.

6. An apparatus as defined in claim 4 or 5 wherein said intermediate jaw is positioned adjacent an incoming web portion at one of said stations and adjacent an outgoing web portion at the other of said stations.

7. An apparatus as defined in claim 4 wherein said carriage is vertically reciprocable by said actuating means for shifting said web-engaging means between said first and second positions.

8. An apparatus as defined in claim 7 wherein each deflecting section comprises at least one roller mounted on said frame at a greater distance from said press than the associated clamping section.

9. An apparatus as defined in claim 8 wherein said roller is coupled with the associated clamping section for joint horizontal displacement by said actuating means.

10. An apparatus as defined in claim 8 wherein said roller is coupled with said actuating means for horizontal displacement relative to said carriage independently of the associated clamping section, the latter being horizontally nondisplaceable on said carriage.

* * * * *